United States Patent [19]

Thuy et al.

[11] Patent Number: 4,698,768

[45] Date of Patent: Oct. 6, 1987

[54] PROCESS FOR SMOOTHING THE CURVES GENERATED IN A TELEVISION SCANNING SYSTEM

[75] Inventors: Pham D. Thuy, Chatenay Malabry; Dominique Vanypre, Igny, both of France

[73] Assignee: SFENA-Societe Francaise d'Equippements pour la Navigation Aereenne, Velizy-Villacoublay, France

[21] Appl. No.: 575,166

[22] Filed: Jan. 30, 1984

Related U.S. Application Data

[63] Continuation-in-part of Ser. No. 246,223, Mar. 23, 1981, abandoned.

[30] Foreign Application Priority Data

Mar. 28, 1980 [FR] France ............................... 80 06974

[51] Int. Cl.[4] ............................................... G06F 3/14

[52] U.S. Cl. .................................... 364/521; 340/744; 340/731; 340/727

[58] Field of Search ........................ 364/518, 521, 519; 178/18, 19; 250/202, 211.5, 678; 340/146.3, 703, 727, 728, 744, 731

[56] References Cited

U.S. PATENT DOCUMENTS

| | | | |
|---|---|---|---|
| 3,809,865 | 5/1974 | Dimeo | 364/519 |
| 4,038,668 | 7/1977 | Quarton | 364/521 |
| 4,117,473 | 9/1978 | Habeger, Jr. et al. | 364/521 X |
| 4,388,620 | 6/1983 | Sherman | 364/521 X |
| 4,481,508 | 11/1984 | Sasaki et al. | 364/518 |

FOREIGN PATENT DOCUMENTS

| | | |
|---|---|---|
| 8006974 | 2/1981 | France . |
| 2077079 | 12/1981 | United Kingdom . |

*Primary Examiner*—Errol A. Krass
*Assistant Examiner*—H. R. Herndon
*Attorney, Agent, or Firm*—Browdy and Neimark

[57] ABSTRACT

A process for smoothing curves, comprising previous storage of a predetermined number of patterns formed from at least two adjacent pixels disposed on the same line or in the same column, step-by-step calculation of the theoretical curve to be plotted, determination for each of the pitches of the pixel closest to the theoretical curve to be plotted, measurement of the distance e from this pixel to the theoretical curve, determination as a function of this distance e of the pattern which corresponds to the elementary position of the curve to be plotted and illumination of the pattern on a visualization surface.

14 Claims, 23 Drawing Figures

| Color | black | dark gray | light gray | white |
|---|---|---|---|---|
| L' | 0 | 1 | 2 | 3 |

| | Σ L′ | Position (h) of the barycenter with respect to the reference axis |
|---|---|---|
| a) 2 / 2 h>0 | 4 | 0 |
| b) 1 / 3 | 4 | 0,25 |
| c) 3 / 1 | 4 | 0,25 |

| | Σ L′ | position (h) of the barycenter with respect to the reference axis |
|---|---|---|
| d) 3 / 3 h>0 | 6 | 0 |
| e′) 1 / 3 / 2 | 6 | 0,33 |
| f) 2 / 3 / 1 | 6 | -0,33 |
| g) 1 / 3 / 1 | 5 | 0,5 |

| sign $(\|F_Y\|-\|F_X\|)$ | sign $(F_X)$ | sign $(F_Y)$ | $f_1$ | $f_2$ |
|---|---|---|---|---|
| + | + | + | 4 | 1 |
| + | + | − | 1 | 1 |
| + | − | + | 5 | 1 |
| + | − | − | 8 | 1 |
| − | − | + | 6 | 0 |
| − | − | − | 7 | 0 |
| − | + | + | 3 | 0 |
| − | + | − | 2 | 0 |

$N = f_3$ (octant, sign F)

| Octant | 1 | 2 | 3 | 4 | 5 | 6 | 7 | 8 |
|---|---|---|---|---|---|---|---|---|
| $F > 0$ | 2 | 2 | 1 | 1 | 3 | 3 | 0 | 0 |
| $F < 0$ | 0 | 0 | 2 | 2 | 1 | 1 | 3 | 3 |

| n° pattern | 0 | 1 | 2 | 3 |
|---|---|---|---|---|
| Position of curve | | | | |

FIG. 13 pattern $= f_4(X, F, F_X)$

| fractional part of | X | 0 | 0,25 | 0,5 | 0,75 |
|---|---|---|---|---|---|
| $F_X \geq 0$ | $F \geq 0$ | 1 | 2 | 3 | 0 |
| | $F < 0$ | 2 | 3 | 0 | 1 |
| $F_X < 0$ | $F \geq 0$ | 2 | 3 | 0 | 1 |
| | $F < 0$ | 1 | 2 | 3 | 0 |

pattern $= f_5(Y, F, F_Y)$

| fractional part of | Y | 0 | 0,25 | 0,5 | 0,75 |
|---|---|---|---|---|---|
| $F_Y \geq 0$ | $F \geq 0$ | 1 | 2 | 3 | 0 |
| | $F < 0$ | 2 | 3 | 0 | 1 |
| $F_Y < 0$ | $F \geq 0$ | 2 | 3 | 0 | 1 |
| | $F < 0$ | 1 | 2 | 3 | 0 |

FIG. 14

$X' = f'_4(X, F, F_X)$

| fractional part of | X | 0 | 0,25 | 0,5 | 0,75 |
|---|---|---|---|---|---|
| $F_X \geq 0$ | $F \geq 0$ | E(X) | E(X) | E(X) | E(X+1) |
| | $F < 0$ | E(X) | E(X) | E(X+1) | E(X+1) |
| $F_X < 0$ | $F \geq 0$ | E(X) | E(X) | E(X+1) | E(X+1) |
| | $F < 0$ | E(X) | E(X) | E(X) | E(X+1) |

$Y' = f'_5(Y, F, F_Y)$

| fractional part of | Y | 0 | 0,25 | 0,5 | 0,75 |
|---|---|---|---|---|---|
| $F_Y \geq 0$ | $F \geq 0$ | E(Y) | E(Y) | E(Y) | E(Y+1) |
| | $F < 0$ | E(Y) | E(Y) | E(Y+1) | E(Y+1) |
| $F_Y < 0$ | $F \geq 0$ | E(Y) | E(Y) | E(Y+1) | E(Y+1) |
| | $F < 0$ | E(Y) | E(Y) | E(Y) | E(Y+1) |

FIG. 15
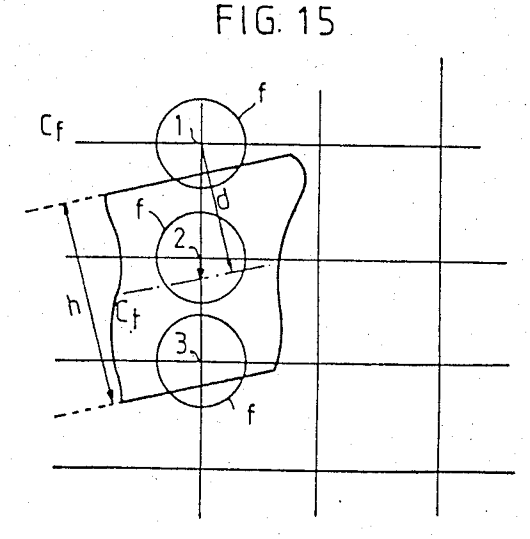
FIG. 16
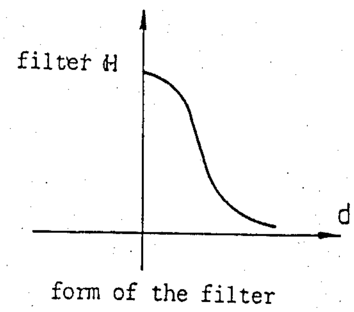
FIG. 17
| | e=-3/8 | e=-1/8 | e=1/8 | e=3/8 |
|---|---|---|---|---|
| $K_1$ | 0,15 | 0,37 | 0,63 | 0,85 |
| $K_2$ | 0,96 | 0,99 | 0,99 | 0,96 |
| $K_3$ | 0,85 | 0,63 | 0,37 | 0,15 |
FIG. 18
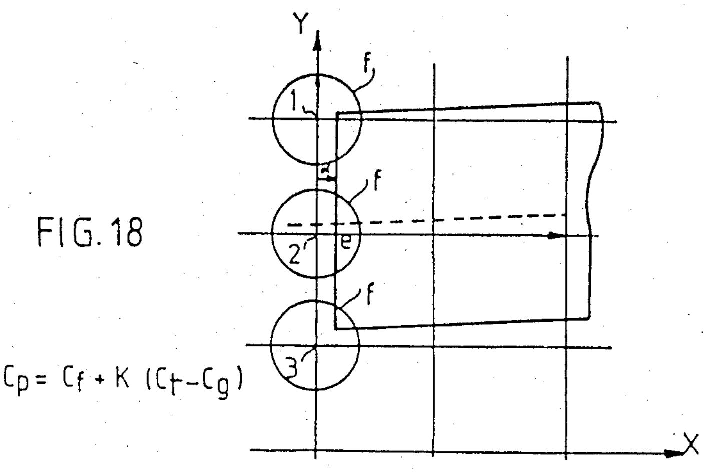
$C_p = C_f + K\,(C_t - C_g)$

FIG. 19

| e \ α | -3/8 | -1/8 | 1/8 | 3/8 |
|---|---|---|---|---|
| -3/8 | 0,13 | 0,10 | 0,05 | 0,02 |
| -1/8 | 0,32 | 0,23 | 0,14 | 0,05 |
| 1/8 | 0,53 | 0,40 | 0,23 | 0,10 |
| 3/8 | 0,72 | 0,53 | 0,32 | 0,13 |

FIG. 20

| e \ α | -3/8 | -1/8 | 1/8 | 3/8 |
|---|---|---|---|---|
| -3/8 | 0,83 | 0,63 | 0,37 | 0,13 |
| -1/8 | " | " | " | " |
| 1/8 | " | " | " | " |
| 3/8 | " | " | " | " |

FIG. 21

| e \ α | -3/8 | -1/8 | 1/8 | 3/8 |
|---|---|---|---|---|
| -3/8 | 0,72 | 0,53 | 0,32 | 0,13 |
| -1/8 | 0,53 | 0,40 | 0,23 | 0,10 |
| 1/8 | 0,32 | 0,23 | 0,14 | 0,05 |
| 3/8 | 0,13 | 0,10 | 0,05 | 0,02 |

PROCESS FOR SMOOTHING THE CURVES GENERATED IN A TELEVISION SCANNING SYSTEM

CROSS-REFERENCE TO RELATED APPLICATIONS

The present application is a continuation-in-part application of U.S. application Ser. No. 246,223 filed Mar. 23, 1981 (now abandoned), the entire contents of which are hereby incorporated by reference.

BACKGROUND OF THE INVENTION

1. Field of the Invention

The present invention relates to a process for smoothing the curves generated by a graphic visualization system of the black and white and color television scanning type.

Generally it is known that the visualization surface of such a system may be divided into an assembly of small fictitious squares called picture elements or "pixels" referenced by the coordinates of their center (X, Y). Usually, an infinite number of pixel positions on the screen corresponds to a given visualization surface and to a given memory size.

These elements are divided up according to a grid (mesh network) whose pitch is given by the distance between two pixels. Thus, the reproduction or even the formation of an image may be obtained by causing, through scanning, a corresponding number of pixels to be illuminated to which a given luminance and, possibly, chrominance are assigned.

The invention relates more particularly, but not exclusively, to a process for smoothing curves generated by a television scanning system, in which the computation of the dots of the screen to be illuminated may be achieved essentially by means of additions and shifts.

Numerous solutions have already been proposed to this end. However, it is proved that, in these known methods of generation, the curves obtained are formed by successions of horizontal or vertical segments (depending on the slope of the curve) off-set with respect to one another while forming staircase steps.

To overcome this disadvantage, it is then advisable to smooth the curve obtained by local reduction of the contrast between the line and the background and by artificially increasing the definition of the image.

2. Description of the Prior Art

There has already been proposed for resolving this problem, more especially by the patent No. FR 2 371 031, a process consisting in representing each point of the curve by adjusting the relative luminosity of a matrix of display elements adjacent the position required for this point of the curve, so that this group of display elements creates a subjective impression of this point of the curve, in its desired position. This process uses more particularly a memory which stores all the possible luminosity contributions required for each display element and an addressing device which reads from the memory, in response to input signals defining the real positions of the points of the curve, the real contributions required for the luminosity of this element. This process has however proved to be relatively complex and requires, for implementation thereof, a relatively powerful processor equipped with large capacity memories.

The invention has then more particularly as its object to provide a process of simple conception using memory spaces of much smaller size and which allows smoothed black and white or color images having a good definition to be obtained despite everything.

SUMMARY OF THE INVENTION

To arrive at this result, the process of the invention comprises then the following steps:

storing beforehand a predetermined number of patterns formed of at least two adjacent pixels disposed on the same line or in the same column and each representing an elementary curve portion (this elementary curve portion possibly corresponding with the barycenter of the pattern), these patterns being addressable depending on the position in the pattern of said elementary curve portion, the step by step computation of the theoretic curve to be plotted, the determination for each of the pitches of the mesh network, in the visualization surface, of the pixel the nearest to the theoretical curve to be plotted, the measurement, at least approximative, of the distance "e" of this pixel from said theoretical curve, the determination as a function of this distance "e" of the pattern whose elementary curve portion corresponds substantially to that of the theoretical curve to be plotted, the illumination of said pattern on the visualization surface.

The above described process uses then a plotting algorithm for successively determining the pixels the closest to the theoretical curve to be plotted. Now, it is known that it is easy to form a vector having as origin the center ($X_0Y_0$) of a pixel and as its end the center ($X_nY_n$) of another pixel.

The generation of this vector may be provided according to Bresenham's algorithm which consists, in the case where the vector passes through the first quadrant and has a slope less than 45° of

- illuminating the pixel with coordinates $X_0Y_0$,
- incrementing X by a unit, X then passing to $X_1$,
- determining the value of the difference "e" (with sign) between the vector and the center of the pixel with coordinates $X_1Y_0$,
- comparing this value "e" with a value H/2 equal to half the height of a pixel,
- incrementing Y, which passes to $Y_1$, if "e" is greater than H/2,
- conserving the value $Y_0$ if "e" is less than H/2,
- in illuminating as the case may be the pixel with coordinates $X_1$ $Y_1$ or $X_1$ $Y_0$,
- in again incrementing X by a unit (X passing to $X_2$ and in repeating the procedure until the pixel with coordinates $X_n$ $Y_n$ is reached.

It is obvious that all the other cases may follow from this algorithm by different symmetries:

| | |
|---|---|
| slope value greater than 45° | $X \rightleftarrows Y$ |
| vector in the second quadrant | $X \to -X$ |
| vector in the third quadrant | $X \to -X$ |
| | $Y \to -Y$ |
| vector in the fourth quadrant | $Y \to -Y$ |

Thus, in the process of the invention, so as to obtain smoothing of the curve, instead of illuminating a pixel for each of the values of "e" of Bresenham's algorithm, a pattern is illuminated formed by at least a pair of adjacent pixels disposed in the same line or in the same column, and whose luminances are chosen so that the elementary curve portion represented is situated substantially on the curve to be plotted, while causing, for the homogeneity of the plot, all the patterns to have substantially the same total luminance value.

It should be noted that in Bresenham's algorithm the distance "e" is evaluated from an internal parameter, namely the power of a point considered with respect to the curve.

The invention also proposes another plotting algorithm suitable for implementing the above described process and in which the distance "e" is determined in a way completely external to the algorithm.

With this algorithm, the theoretical curve may more particularly be followed over a mesh n times finer (for example 4 times) than the mesh of the pixel fractionated display surface, and thus a curve may be obtained smoothed to 1/n pixel (for example to $\frac{1}{4}$ pixels). Furthermore, the fractional part along coordinates X and Y will allow an approximation of "e" to be obtained immediately.

Generally, it is known that a curve may be characterized, in the mathematical domain, by knowledge of its associated quadratic form F (x,y).

Thus, for example, in the case of a conical curve, the associated quadratic form will be of the form:

$$F(x,y)=Ax^2+2\,Bxy+Cy^2+Dx+Ey+K$$

which equation may be resolved incrementally by means of the well known formula:

$$F(x+dx,y+dy)=F(x,y)+\sum_{n=1}^{\infty}\frac{1}{n!}\,d^nF(x,y)$$

Moreover, the parameters A, B, C, D, E, K may be chosen so that:

- the whole of the points (x,y) such as $F(x,y)>0$ are outside the curve,
- the whole of the points (x,y) such as $F(x,y)=0$ are on the curve,
- the whole of the points (x,y) such as $F(x,y)<0$ are inside the curve.

The invention proposes using these characteristics so as to effect the plot of a smoothed curve in accordance with the process of the invention by determining, by means of an incremental procedure, from the contact elements of its ends, the discrete set (xi,yi) of the points which best follow the curve of equation $F(x,y)=0$ in a mesh network with a finite number of lines and columns, whose pitch is reduced to a fraction, for example $\frac{1}{4}$ of the pitch of the mesh network of the visualization surface.

To reach this result, the smoothing process then comprises the following steps:

in an initial phase, computation of the partial derivatives of the function at the point marking the beginning of the curve with coordinates $x=x_D$, $y=y_D$, determination of the horizontal or vertical character of the pattern to be applied depending on the sign of the first derivatives, FX, FY and on the sign of the difference between the absolute values of FX and FY, determination of a change of octant, testing of the end of the curve a determination of an incrementation, $(\Delta x)$, $(-\Delta x)$, $(\Delta y)$ or $\Delta y$ equal in absolute value to the reduced pitch, as a function of the octant and of the sign of the function F(x,y), updating of F(x,y) and of the partial derivatives at the new point obtained on the reduced pitch mesh network, depending on whether the pattern to be applied is vertical or horizontal, detection of the passage of x or y to a whole value, that is to say a value equal to a whole pitch number of the mesh network of the display surface, and repetition of the procedure from said detection of octant change if x and y are fractional, in the case where y is a whole number, determination of a pattern as a function of the value of "e" which is substantially equal to the value of the fractional part of x, depending on the signal of the derivative $\partial F/\partial Y$ and on the sign of the value F, by means of a truth table, and illumination of the pattern at the point (x', y), x' being determined by a truth table as a function of the derivative $\partial F/\partial Y$ and of the sign of F, in the case where x is a whole number, determination of a pattern as a function of the value "e" which is then substantially equal to the fractional value of y, as a function of the sign of the derivative $\partial F/\partial x$ and of the sign of the value F, by means of a truth table, and illumination of this pattern at the point (x,y'), y' being determined as a function of the derivative $\partial F/\partial x$ and of the sign of F, repetition of the procedure from said detection of octant change, once a pattern has been illuminated.

The application of the above described process to smoothing a color image requires definition of several intermediate colors $C_1$ $C_{n-1}$ between the color of the line $C_n$ and that of the background $C_0$.

Thus, in a first solution according to the invention, so as to present the least contrast therebetween and between $C_0$ and $C_n$, these intermediate colors are taken on the segment $C_n$ $C_0$ plotted in a space of substantially uniform colors, for example the space (U, V, Y). The value of the luminances (values $Y'_1$, $Y'_2$, ... $Y'_{n-1}$ in the space X, Y, Z) of these intermediate colors $C_1$, $C_2$, ... $C_{n-1}$, as well as their chrominance (for example computation in the plane UV or even in the space L*, U*, V* defined in 1976 by the Commission Internationale de l'Eclairage) are therefore intermediate. Thus, to plot said curves, a given number of n patterns $a_1$, $a_2$ ... $a_n$ may be used each formed from at least one pair of adjacent pixels situated in the same column, the positions of the elementary curve portions represented by these patterns being offset with respect to each other.

In this case, the choice of the patterns $(a_1 \ldots a_n)$ to be applied is determined as a function of the position of said value "e" with respect to a series of values $h_1 \ldots h_n$ established beforehand.

According to another solution, so as to determine the smoothing colors, the same relations are applied to the three primary colors for example red, green and blue and the additive synthesis of these colors is carried out. Furthermore, it will be recalled that an elementary curve portion is considered microscopically as a rectangle. Thus, for computing the color of a pixel close to the curve, the effect produced by this rectangle on a pixel is computed. For this, a reconstruction filter is applied to this pixel and the contribution of the curve on this pixel through the filter is computed by the convolution between the curve to be plotted and the filter, which allows the value to be attributed to the pixel to be deduced for regenerating the effect produced by the curve passing close to this pixel.

More precisely, if we call the color of the background $C_f$ and the color of the line $C_t$, the color $C_p$ of the pixel will be determined by the equation:

$$C_p = C_f + K(d,h)\ (C_t - C_f)$$

in which the variable K(d,h) is a function of the reconstruction filter, of the distance d from the pixel to the elementary curve portion and of the thickness h of the curve. In actual fact, this variable K(d,h) is the result of the convolution between the elementary curve portion and the reconstruction filter.

The variable K(d,h) is determined by a table providing, for each of the pixels forming a pattern and for a given curve thickness, the value of K(d,h) as a function of the value of e used for determining this pattern.

BRIEF DESCRIPTION OF THE DRAWINGS

Embodiments of the invention will be described hereafter, by way of non limiting examples, with reference to the accompanying drawings in which:

FIGS. 10 to 14 are truth tables for determining the different parameters used by the algorithm shown in FIG. 9;

FIG. 15 is a diagram representing a portion of the visualization surface, this diagram illustrating one method for determining the color of the pixels used for plotting the curve;

FIG. 16 is a diagram showing the characteristic shape of the filter;

FIG. 17 is a truth table for determining the coefficient K(d,h) assigned to each pixel of a pattern as a function of the value "e";

FIG. 18 is a diagram representative of a portion of the visualization surface for illustrating one method for determining the color of the pixels used at the ends of the curve;

FIGS. 19, 20 and 21 are truth tables for determining the coefficient K(d) assigned to the patterns situated at the ends of the curve;

DESCRIPTION OF THE PREFERRED EMBODIMENTS

Figure 1:
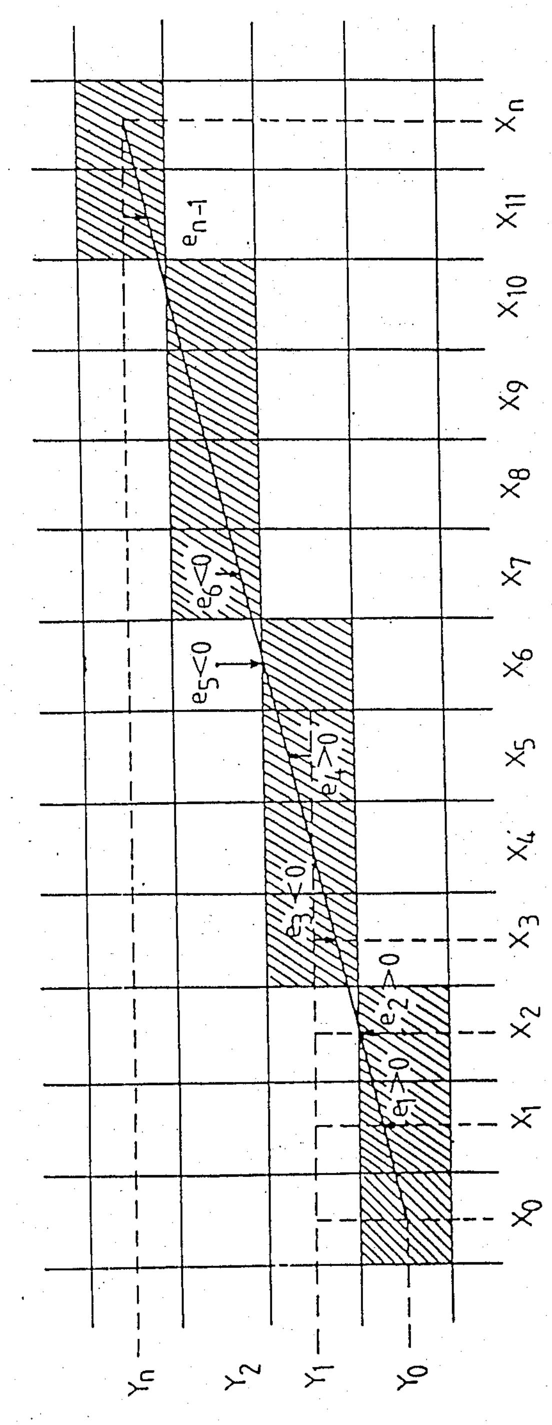
FIG. 1 is a partial schematical representation of a vector which it is desired to plot on a television screen of which the pixels have been shown.

With reference to FIG. 1, the television screen has been partially shown in the form of a grid in which each square, with sides equal to unity, represents a pixel defined by the coordinates X, Y of its center. In this screen, the vector A, B to be plotted has as origin the center of the pixel with coordinates $X_0$, $Y_0$ and as end the center of the pixel with coordinates $X_n$, $Y_n$. There has further been shown in each of the pixels through which the vector passes, the differences $e_1 \ldots e_{n-1}$ between the center of the pixels and said vector, these differences being used, as previously mentioned, for plotting the vector by using Bresenham's algorithm. According to this algorithm and, in accordance with the flow chart shown in FIG. 2, in a first phase, the pixel with coordinates $X_0$ $Y_0$ is illuminated (block 11). Then X is increased by a unit ($X_0 \rightarrow X_1$) then the difference $e_1 = e_0 + 2\ (Y_1 - Y_0)$ (block 12) is computed.

The inequality $e > X_n - X_0$ means that the pixel just above is the closest to the curve, whereas the inequality $e \leqq X_n - X_0$ means that the pixel is the closest to the curve.

If "e" is less than or equal to $X_n - X_0$, which is the case for $e_1$, the pixel with coordinates $X_1Y_0$ is then illuminated (block 15). The system then checks that $X_1$ is less than $X_n$ (block 16) and orders a further incrementation of X which passes to $X_2$ for the next sequence.

The system then computes the value of $e_2$ which is greater than zero. Consequently, the pixel with coordinates $Y_0$ $X_2$ is illuminated and the system carries out a further incrementation of X which passes to $X_3$, and computes the value of $e_3$. Since this value $e_3$ is greater than $X_n - X_0$, the system increments Y and corrects the value of $e_3$ which again becomes less than $X_n - X_0$ (block 14). The pixel with coordinates $X_3Y_1$ is then illuminated. This procedure continues until the value of X becomes equal to the value $X_n$. Thus, the staircase curve, shaded area in FIG. 1 is obtained.

To overcome this disadvantage, the invention proposes a smoothing process consisting in causing, at the end of each of the sequences, at least two pixels (instead of one) to be illuminated whose luminance is such that their barycenter (taking the luminance as coefficient) is situated on the vector to be plotted.

In fact, if two patterns a and b are formed for example of which one, pattern a, is uniformly white and the other, pattern b is half gray and half white, an observer at a sufficient distance will see them as dots of different tints and especially positioned differently. The invention uses then this characteristic for bringing the visual perception location into coincidence with the curve to be plotted.

Figures 2, 3:
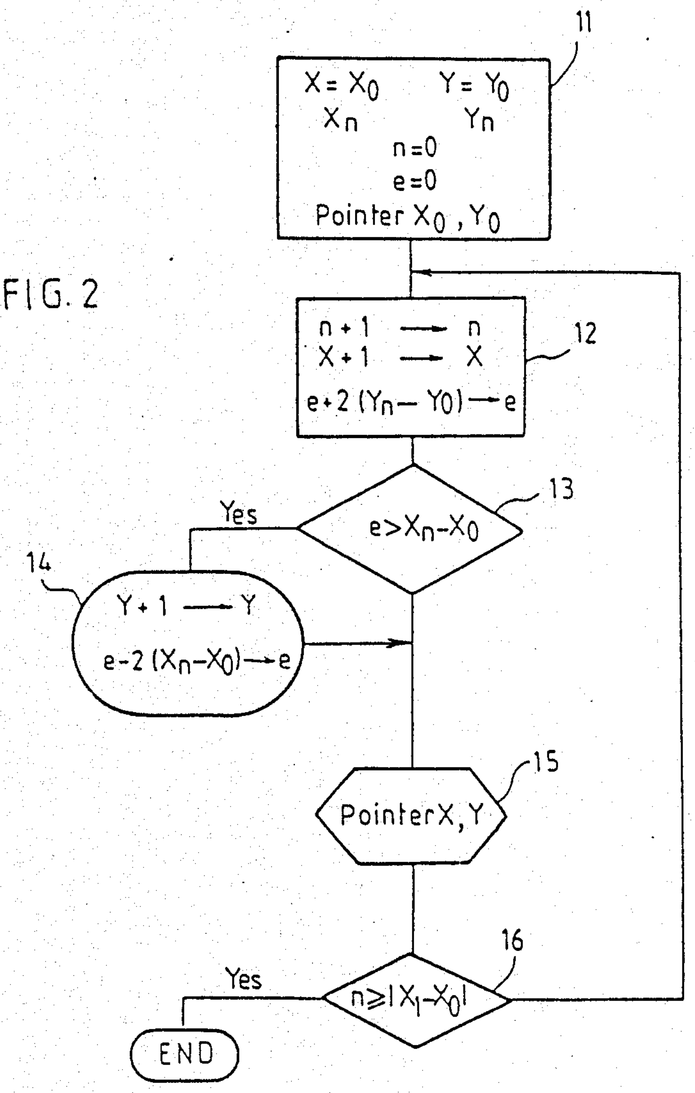
FIG. 2 is a simplified flow chart of Bresenham's algorithm for generating a vector with a slope less than 45° in the first quadrant (first octant)
FIG. 3 is a table in which has been numbered the luminance L for a gray scale (going from black to white)

The table shown in FIG. 3 provides numbering of the four luminance values L' supplied by a conventional television tube (these values being substantially linear).

Thus, a fine line may be obtained by means of three types of patterns formed by at least two adjacent pixels disposed in the same column, namely (FIG. 4):

a pattern a comprising two coloration pixels 2 (light gray) in which the position of the elementary curve portion which it represents will be located, in this example, by the position of the barycenter situated on a median reference axis (position 0);

a pattern b comprising two pixels, namely: an upper luminance pixel 1 (dark gray) and a lower luminance pixel 3 (white), the position of the barycenter being situated at −0.25 (with respect to the reference axis);

a pattern c comprising an upper luminance pixel 3 (white) and a lower luminance pixel 1, the position of the barycenter being situated at 0.25 with respect to the reference axis.

The choice of the luminances of each of the patterns is made so that the sum of the luminances of the two pixels which forms it is constant. In the example shown in FIG. 4, it is equal to 4.

In this example:

| | |
|---|---|
| pattern a is applied when | $-0.5 < e < -0.3$ |
| and when | $0.3 < e < 0.5$ |
| the pattern c is applied when | $-0.3 \leqq e \leqq 0$ |
| pattern b is applied when | $0 < e < 0.3$ |

In the case of a vector with a negative slope, the patterns b and c will be reversed.

Figures 4, 5, 6:
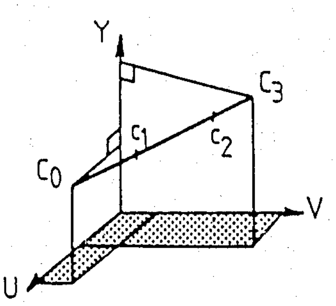
FIGS. 4 and 5 shows an assembly of patterns usable for generating a fine line (patterns a, b, c, (FIG. 4) and for generating an average line (patterns d to g (FIG. 5))
FIG. 6 is a U, V, Y diagram for determining, in this example, the intermediate colors.

For forming a line of average thickness, patterns d, e', f, and g are used having two or three pixels shown in FIG. 5. It will be noted that in these latter the sum of the luminances of the two or three pixels is constant and equal to six, with the exception of pattern g in which the sum of the luminances is equal to five. The use of pattern g will then provide an impression of discontinuity.

Thus, during the generation of a curve:

| | |
|---|---|
| pattern d is applied when | $\frac{3}{8} \leqq e \leqq 0.5$ |
| and when | $-0.5 < e < -\frac{3}{8}$ |
| pattern f is applied when | $\frac{1}{8} \leqq e < \frac{3}{8}$ |
| pattern e' is applied when | $-\frac{3}{8} < e \leqq \frac{1}{8}$ |
| pattern g is applied when | $-\frac{1}{8} < e < \frac{1}{8}$ |

Similarly to what has gone before, when the slope of the vector is negative, it is sufficient to reverse columns a and f.

In the case where the lines to be formed are very thick, it is sufficient to apply the fine line algorithm to the edges of this line.

It can be seen that the above described process, whether it is a question of a fine line, of a medium line or of a thick line, allows a smoothing effect to be obtained while coding the grays over only two bits.

Moreover, in any case, the number of intermediate grays required for obtaining a given smoothing quality increases with the luminance delivered for the white. In fact, the perception of the frontier between two grays depends on the differences of their luminances. The higher this difference, the poorer will be the quality of the smoothing. The previously described principle of smoothing white curve on black may be used for color smoothing. It requires the definition of several intermediate colors between the color of the line and that of the background. The quality of the image increases with the number of intermediate colors used.

With reference to FIG. 6, the colors of the line and of the background are represented by two points $C_3$ and $C_0$ in the space of the colors (U, V, Y). The intermediate colors $C_1$ and $C_2$ are taken from the segment of $C_3 C_0$ so as to present the least contrast therebetween and between $C_0$ and $C_3$. $C_1$ and $C_2$ are then intermediate in luminance (value of Y) and in chrominance (computation in the plane u,v). The luminance differences between $C_0$ and $C_1$, $C_1$ and $C_2$, $C_2$ and $C_3$ are taken as equal.

They can then be written:

$$Y_1 = \frac{2Y_o + Y_3}{3}$$

$$Y_2 = \frac{2Y_3 + Y_o}{3}$$

$Y_1$ being the luminance at point $C_1$,
$Y_2$ being the luminance at point $C_2$,
$Y_3$ being the luminance at point $C_3$,
$Y_o$ being the luminance at point $C_0$.

The chrominance differences between $C_0$ and $C_1$, $C_1$ and $C_2$, $C_2$ and $C_3$ are taken as equal.

In the plane u, v that can then be written:

$$u_1 = \frac{2u_0 + u_3}{3}$$

$$u_2 = \frac{2u_3 + u_0}{3}$$

$$v_1 = \frac{2v_0 + v_3}{3}$$

$$v_2 = \frac{2v_3 + v_0}{3}$$

$u_0$, $u_1$, $u_2$, $u_3$ and $v_0$, $v_1$, $v_2$, $v_3$ being the respective coordinates of the points $C_0$, $C_1$, $C_2$, $C_3$ in the plane u,v. Of course, the determination of the intermediate colors may be achieved by using, instead of the space u,v,y, the space (l*, u*, v*) defined by the following relationships:

$$1^* = 116\,(Y/Y_n)^{\frac{1}{3}} - 16$$

$$u^* = 13\ 1 + (u' - u'_n)$$

$$v^* \text{ '' } 13\ 1 + (v' - v'_n)$$

$$Y/Y_n > 0.01$$

$$\text{with } u' = \frac{4X}{X + 15Y + 3Z}$$

$$v' = \frac{9Y}{X + 15Y + 3Z}$$

in which relationships: (X, Y, Z) are the components in the space (X, Y, Z) 1931, the index n refers to the illuminance of reference A or D65. . . 1* is called psychometric brightness CIE 1976.

According to this space, the difference between two colors is then defined by $$E^*_{uv} = [l^{*2} + u\ u^{*2} + v^{*2}]^{\frac{1}{2}}$$

The patterns used for forming color curves may be substantially the same as those described in connection with FIGS. 3 and 4, except that the black color is replaced by the color of the background $C_0$, for example, green, dark gray is replaced by the intermediate color $C_1$ (close to $C_0$), the light gray is replaced by the intermediate color $C_2$ close to that of the line, white is replaced by the color of the line for example red.

Of course, because of the limits of the electron tubes used, it is not always possible to form exactly colors having values calculated in the above described way.

The values used are then obtained by trying to respect the chrominances (percentage of R, V, B) and to approximate the calculated luminances by approximating the luminance of the line, for $C_2$, and that of the background, for $C_1$. It would then seem that color smoothing is relatively more delicate than black and white smoothing, because there are two parameters to be controlled instead of a single one and because the eye does not always respond in the same way to colored light excitation.

Smoothing is nevertheless obtained by using patterns of the kind developed for black and white smoothing, depending on the value e of Bresenham's algorithm, the intermediate colors being determined by computation using a uniform color space.

As mentioned above, FIGS. 7 to 14 illustrate the principle of plotting a curve with smoothing according to a second embodiment of the invention. In this example, the curve to be plotted is a conical arc whose associated quadratic form is known and which is written:

$$F(x,y)=Ax^2+2\,Bxy+Cy^2+Dx+Ey+K$$

and of which the coordinates of the ends $x_0$, $y_0$ and $x_F$, $y_F$ are known.

More precisely, the aim of the invention is to determine, by an incremental procedure, the discrete set ($x_i$, $y_i$) of the points best following the conic of equation F(k,y)=0 and this in a mesh network whose reduced pitch is equal to a fraction (in the example shown ¼) of the pitch of the mesh network (grid) of the visualization surface. In other words, this means that the increment (x,y) which will be used for following the curve will be equal to ¼ of the pixel of the vizualization surface.

Such a plot involves more especially the determination of each increment $+\Delta x$, $-\Delta x$, $+\Delta y$, $-\Delta y$ according to the slope of the curve at this point (determination of the octant) and the position of the point $F(x_{n-1}, Y_{n-1}\pm\Delta y)$ or $F(x_{n-1}\pm\Delta x, y_{n-1})$ with respect to the curve.

The determination of the octant is obtained from the sign of the first derivative $FX=\frac{1}{4}(\partial F/\partial x)$, $FY=\frac{1}{4}(\partial F/\partial y)$ and from the sign of the difference between the absolute value FX and the absolute value FY. This determination may be achieved by means of a decoder whose truth table gives the value of the octant $f_1$ (FX, FY) (FIG. 10) as a function of the signs (FX), (FY) and of (|FX|−|FY|). This decoder may further give an indication $f_2$ (octant) for knowing if the pattern to be used should be vertical or horizontal.

Figures 10, 11, 12:
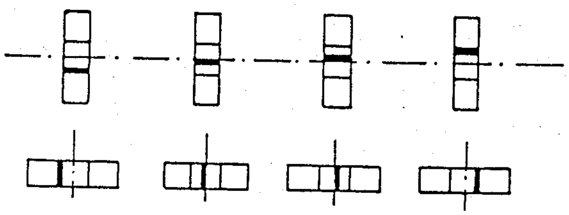

The determination of the increment $+\Delta x$, $-\Delta x$, $+\Delta y$, $-\Delta y$ to be used is effected as a function of the previously determined octant and of the sign of the function F(x,y). In fact, the sign of the function F(x,y) will indicate if the point is on the curve F(x,y)=0, above the curve F(x,y)>0 or below the curve F(X,Y)<0. This determination may be effected by means of a decoder whose truth table $N=f_3$ (octant, sign) is shown in FIG. 11. According to this truth table, for N=0, an increment $\Delta x=0.25$, will be applied, for N=1 and increment $-\Delta x=-0.25$ will be applied, for N=2 an increment $\Delta y=0.25$ will be applied and for N=3 and increment $-\Delta y=-0.25$ will be applied. The determination of the pixels of the visualization surface the closest to the previously determined points (xi, yi) in the reduced pitch mesh network, may be obtained in a very simple way: in fact, these pixels will be determined each time that the values xi or yi have a whole value following the octant.

In this case, the value "e" will be easily obtained by the fractional part of xi or yi. From this value "e", it will then be possible to determine a light pattern, for example of three adjacent pixels, whose elementary curve portion which they are supposed to represent is located by a central axis which would correspond to whole xi or whole yi values (FIG. 15). It should be noted that these patterns are determined beforehand and may be stored, the addressing of these patterns being effected in accordance with the truth table shown in FIG. 12, from the number of patterns and from description of the position of the curve (choice of a horizontal pattern or a vertical pattern).

The number of the pattern may be determined by means of a decoder whose tables of truth are shown in FIG. 13, depending on the fractional part of xi or yi, on the sign of the function F (x,y) and on the sign of the first derivatives FX, FY.

The problem which remains to be solved is then that of determining the place where the pattern should be applied. In fact, depending on the value of the fractional part of Xi or Yi, depending on the sign of the first derivatives FX, FY and depending on the sign of the function F, the pattern will be positioned on the pixel with coordinates (Xi, Yi), (Xi+1, Yi) or (Xi, Yi+1). This determination may be obained by means of a decoder whose truth tables are shown in FIG. 14.

The next step then consists in illuminating the previously determined pattern at the previously defined place. It should be noted that smoothing at the ends of the curve is obtained by directly estimating, from the coordinates of the beginning and end of the curve, the coefficients $\alpha$ and "e" which are related to distances from endpoints of the curve to the coordinates Xi, Yi of the nearest pixel, respectively, and attributing as function of these distances patterns having the corresponding numbers. Such a procedure presents no difficulty for a man skilled in the art and will accordingly not be described.

Figure 9:
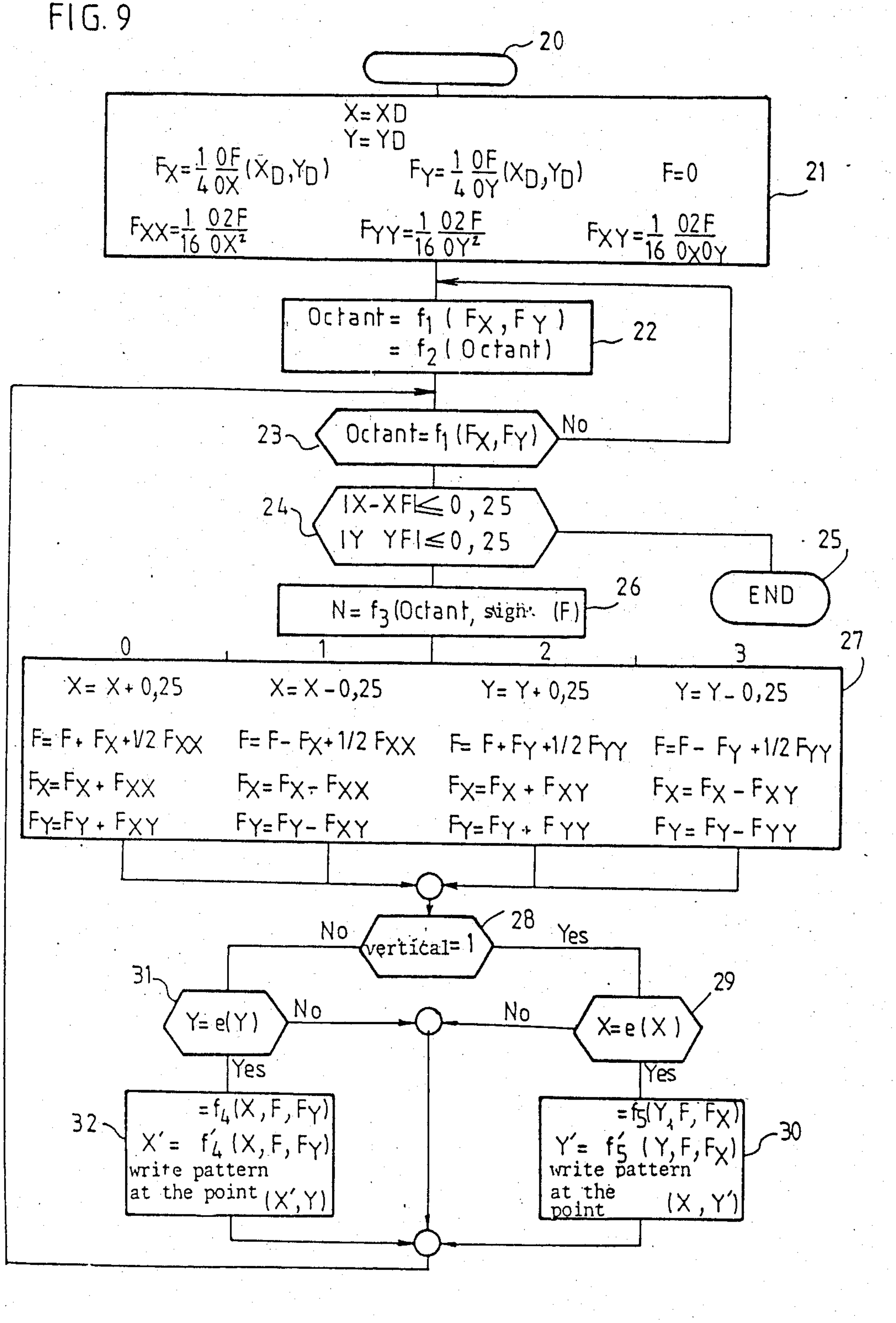
FIG. 9 is an algorithm for plotting a curve with smoothing in accordance with said second embodiment of the invention.

FIG. 9 shows an algorithm for plotting a smoothed curve in accordance with the above described procedure.

Starting from the beginning (block 20), the algorithm comprises first of all an initialization phase (block 21) in which computation of the first and second derivatives is expressed in fractions of pixels of the function F (x,y) at point D (beginning of the curve), having coordinates XD and YD, these derivatives being the following:

$$FX = \frac{\partial F(xD\ yD)}{\partial x} \times \frac{1}{4}$$

$$FY = \frac{\partial F(xD\ yD)}{\partial Y} \times \frac{1}{4}$$

$$FXX = \frac{\partial 2F\ (xD\ yD)}{\partial x2}\ \ \frac{1}{16}$$

$$FYY = \frac{\partial 2F\ (xD\ yD)}{\partial x2} \times \frac{1}{16}$$

$$FXY = \frac{\partial 2F\ (xD\ yD)}{\partial x \partial y} \times \frac{1}{16}$$

Since the point with coordinates xD, yD is on the curve, the function F(x,y) is equal to zero.

In the second phase (block 22), the octant (octant=$f_1$ (FX, FY), and the nature, vertical or horizontal, of the pattern to be applied (vertical=$f_2$ (octant)) is determined by means of the truth table shown in FIG. 10.

In a third phase, the system checks at block 23 that the octant (octant=$f_1$ (FX, FY)) has not changed following an incrementation. If the octant has changed, the system is relooped upstream of block 22, otherwise next phase starts.

In a fourth phase, the system carries out an end of run test (block 24). This will be detected if the absolute value of the difference x−XF and the absolute value of the difference y−YF are less than or equal to 0.25 (YF and XF being coordinates of the final point of the curve). If the end of the curve is detected, the procedure is finished (block 25). In the case where the end of the curve is not detected, the next phase (the fifth) consists in determining the increment, by means of the truth table shown in FIG. 11 (block 26).

The system then computes (sixth phase-block 27), depending on the value of the previously determined increment, the values:

$$x = x + 0.25$$
$$F = F + Fx + \tfrac{1}{2} FXX$$
$$FX = FX + FXX$$
$$FY = FY + FXY$$
$$x = x - 0.25$$
$$F = F - FX + \tfrac{1}{2} FXX$$
$$FX = FX - FXX$$
$$FY = FY - FXY$$
$$y = y + 0.25$$
$$F = F + FY + \tfrac{1}{2} FYY$$
$$FX = FX + FXY$$
$$FY + FY + FYY$$
$$y = y - 0.25$$
$$F = F - FY + \tfrac{1}{2} FYY$$
$$FX = FX - FXY$$
$$FY = FY - FYY$$

The seventh step is branching depending on the vertical or horizontal nature of the pattern to be used (block 28):

(a) if the pattern to be used is vertical, the next step is detection of the passage of x through a whole value (block 29), if the value of x is not a whole value the system loops back upstream of the block (23) for calculating the new point; on the other hand, if the value of x is a whole value, the system passes to the next step (block 30) in which are carried out the following operations:

- determination of the number of the pattern (pattern=$f_5$ (Y, F, Fx) from the truth table shown in FIG. 13,
- determination of the place where the pattern Y'=f'$_5$(Y, F, FX) should be applied by means of the table of truth shown in FIG. 14,
- illumination of the pattern at point X, Y' using the truth table shown in FIG. 12. Once the pattern is illuminated, the system is relooped to upstream of block 23;

(b) if the pattern to be used is horizontal, the next step is detection of the passage of y through a whole value (block 31), if the value of y is not a whole value, the system is relooped to upstream of block 23 for calculating the new point. On the other hand, if the value of y is a whole value, the system passes to the next stage (block 32) in which the following operations are carried out:

- determination of the number of the pattern (pattern=$f_4$ (x, F, FY) by means of the table of truth shown in FIG. 13,
- determination of the place where the pattern X'=f'$_4$ (x, F, FY) should be applied by means of the table of truth shown in FIG. 14,
- illumination of the pattern at point X', Y using the table of truth shown in FIG. 12.

In a similar way, once the pattern is illuminated, the system is relooped to upstream of block 23.

Figure 7:
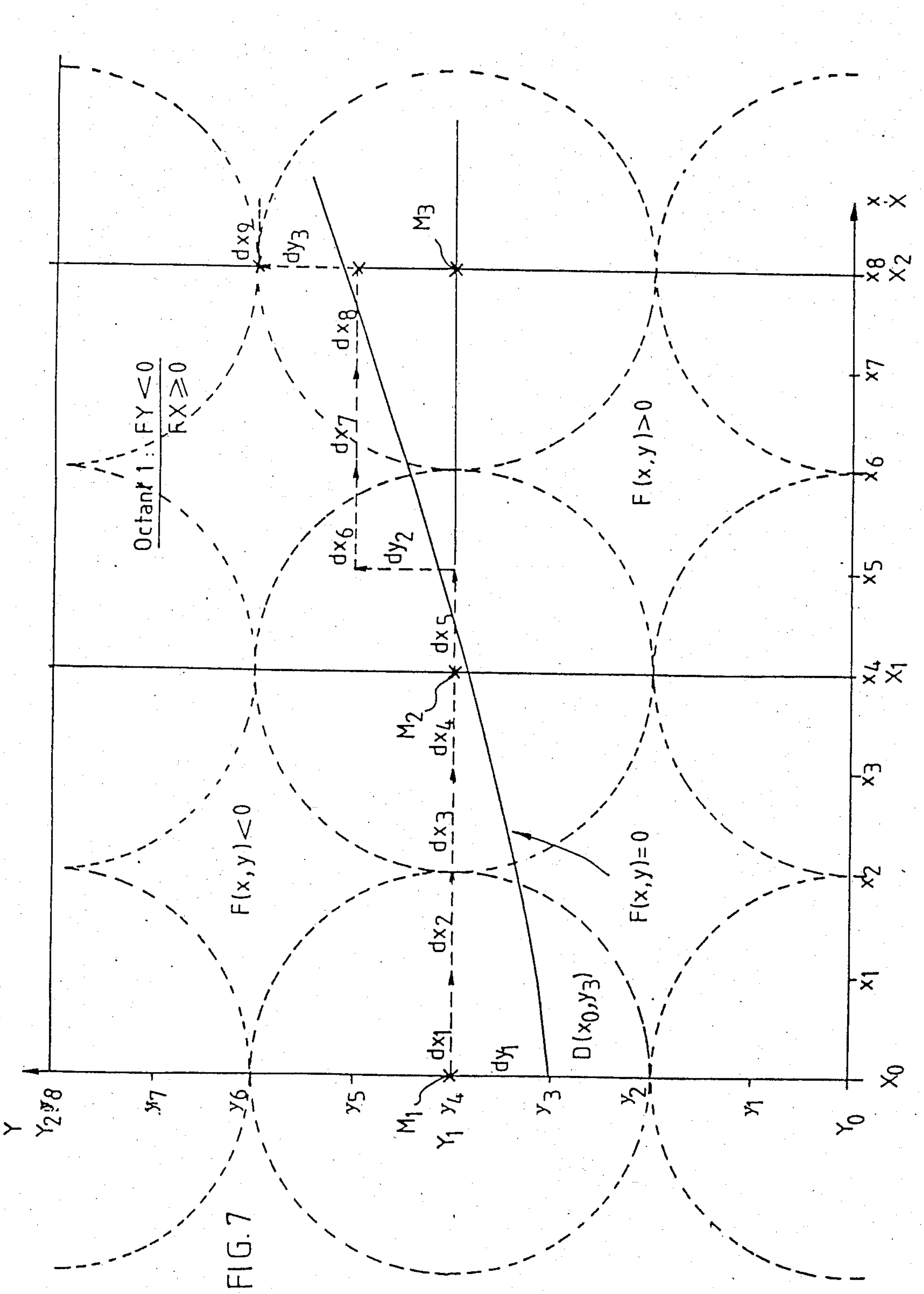
FIG. 7 is a diagram showing on a larger scale a portion of the visualization surface, this diagram illustrating the principle of the plot with smoothing of a curve, according to a second embodiment of the invention.

FIG. 7 illustrates the principle of the above described plotting method. In this figure the mesh network (or grid) of the display surface is shown according to the coordinates X, Y. In this network, the pixels are located by intersection of the lines Y0, Y1 . . . Yn with the columns $X_0, X_1 \ldots X_n$ (in solid lines). The reduced pitch mesh network is shown by the lines Y0, Y1 . . . Yn and the columns $x_0, x_1 \ldots x_n$ (in broken lines in the intervals of the mesh of the display surface).

In this network as shown, the theoretical curve C=F(x,y) to plot has an origin D and an end F. In the reduced pitch mesh network the coordinates of D are $x_0$ and $Y_3$.

The procedure for plotting the curve according to the algorithm shown in FIG. 9 is carried out as follows:

First of all, the algorithm effects initialization 35 of X at the value $x_0$ and of Y at the value $Y_3$. We are then at point D on the curve, and F=0. The system will then increments Y by a value of $dy_1$ which determines the point of coordinates ($x_0$, $Y_4$). Since the curve is in the first octant, the patterns to be applied are vertical. Furthermore, at point $x_0$, $Y_4$ X =0, the fractional value of Y is zero, F is less than 0 and the derivative FY is less than 0. Consequently the pattern $M_1$ to be applied, read from the pattern table equals $f_5$ (Y, F, FY) is the pattern number 1. The next point, determined by the new calculation of N, has as coordinates ($x_1$, $Y_4$) obtained by an incrementation $dx_1$. Since X is not whole, the system proceeds in a similar way to incrementation $dx_2$, $dx_3$ then $dx_4$, for which the algorithm does not plot any new patterns. The incrementation $dx_4$ determines the point with coordinates ($x_4$, $Y_4$). In this curve portion, the patterns to be applied are always vertical, the derivative FY is negative and X=$x_4$ is whole. The algorithm determines the number of the pattern from the pattern table =$f_5$ (Y, F, FY) with F<0, fractional part of Y zero and FY negative. The pattern $M_2$ found is then the pattern number 1. The procedure continues then until the point with coordinates ($y_5$, $X_2$) is determined and so on up to the end of the curve.

Figure 8:
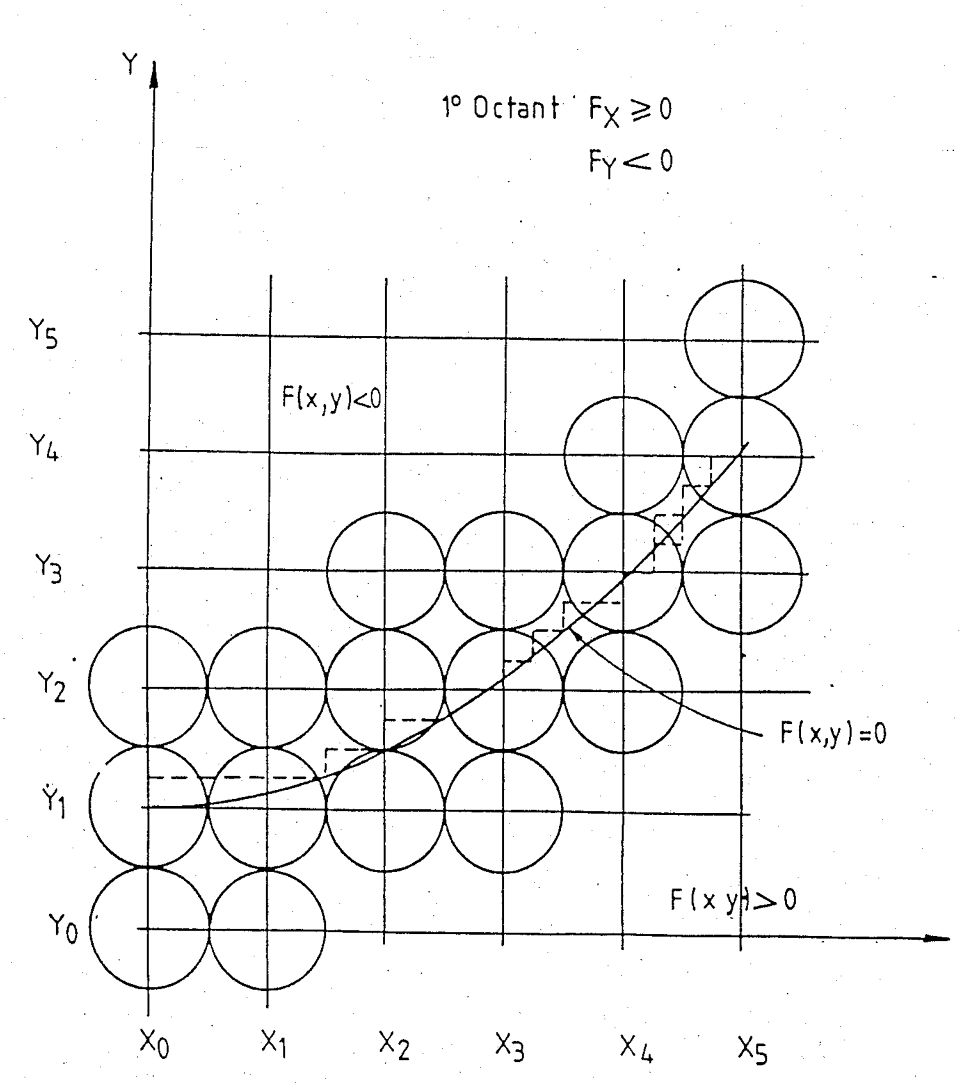
FIG. 8 is a diagram showing, on a larger scale, the visualization surface, on which a curve is plotted by means of vertical patterns and horizontal patterns.

FIG. 8 shows on a larger scale the plotting of a curve by means of vertical and horizontal patterns each comprising three pixels shown by circles. The nodes marked by points correspond to the set of discrete points (xi, yi) found by the algorithm in the reduced pitch mesh network, and the nodes marked by crosses represent the discrete set of the centers of the pixels (Xi, Yi) of the visualization surface the closest to the points found (xi, yi) and on which a pattern is applied.

With the smoothing process according to the above described example curves may be obtained smoothed to ¼ of a pixel and use four different patterns taken horizontally or vertically, symmetrical in pairs corresponding to elementary curve portions removed by a distance +"e" or −"e" from the reference pixel.

Of course, the colorimetric space used is that of the visualization module. Thus, in the rest of the description, it will be assumed that, in this colorimetric space, the three primary colors are red, green and blue. Furthermore, for determining the smoothing colors, the same relationships will be applied to the three primary colors and an additive synthesis will be effected using the linear properties of the space used. It goes without saying that the same reasoning may be held for other colorimetric spaces, even non linear.

Moreover, as mentioned above, the smoothing of a color image requires the definition of several intermediate colors between the color of the line and that of the background. It should be noted in this connection that the invention is not limited to the above described solution. Starting from the fact that an elementary curve segment is considered microscopically as a rectangle, it is possible to calculate the color of a pixel close to the curve by determining the effect produced on this rectangle by an adjacent pixel. For this, a reconstruction filter f is applied to this pixel and the contribution of the curve on this pixel through the filter is calculated.

In the examples shown in FIGS. 15 to 21, the reconstruction filter f used is a Gaussian filter of revolution with width equal to 0.5 pixel whose form is shown in FIG. 16 and whose value H depends on the distance d from the pixel to the curve portion. In this method, the calculation of the color $C_p$ of the pixel close to the curve may be achieved by means of the formula:

$$C_p=Cf+K(d,h)\ (Ct-Cf)$$

in which:

Cf is a background color,

Ct is the color of the line, and

K (d,h) is a value which depends on the form of the reconstruction filter and on the distance d from the pixel to the background-line transition of the curve portion (K(d,h) $\xi$[0.1].

In actual fact, the value K(d,h) is the result of the convolution between the curve and the reconstruction filter. In practice, in the case of calculating the color of three pixels forming a pattern, calculation of the value K(d) is obtained by means of a decoder, supplying for each of the pixels the value of K (d,h) as a function of the value of "e". The truth table of this decoder is shown in FIG. 17. In this table e takes on successively the values $-\frac{3}{8}$, $-\frac{1}{8}$, $\frac{1}{8}$, $\frac{3}{8}$. In practice, the values of K(d,h) (0.85; 0.96; 0.99) are assumed equal to 0.85 so as to limit the number of different colors required for smoothing.

The same principle is applied for determining the end patterns of the curve. In this case only, the end of a curve is likened to a rectangle portion and the width of the filter used limits to one pattern before or after the influence of the end of the curve. In this case, the formula for determining the color of the pixels forming an endmost pattern of the curve will be of the form:

$$C_p=Cf+K\ (Ct-Cf)$$

in which formula K is determined for a given curve thickness as a function of distances e and α between the pixel and the end of the curve along the two axes of coordinates X and Y (FIG. 18) ($K_1$ being the value K of pixel 1, $K_2$ being the value K of pixel 2 and $K_3$ being the value K of pixel 3).

These values of K are obtained by means of a decoder whose tables of truth are shown in FIGS. 18, 19 and 20. It will be noted that, for limiting the number of smoothing colors required, the above coefficients are approximated to the nearest coefficient K required for smoothing the curve, namely K=0.15; 0.37; 0.63; 0.85.

Figure 22:
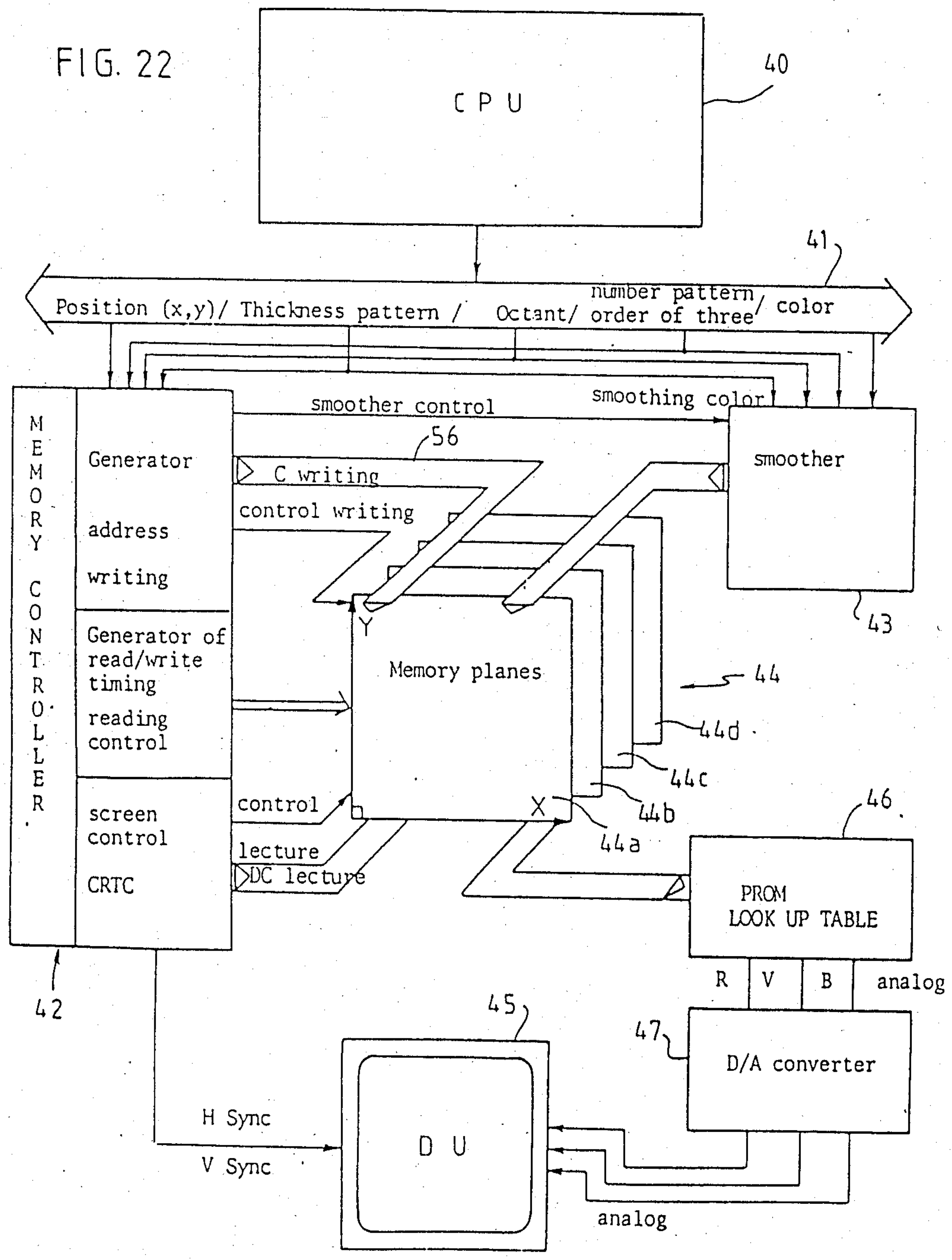
FIG. 22 is a theoretical diagram of the material architecture of the device for implementing the process of the invention.
Figure 23:
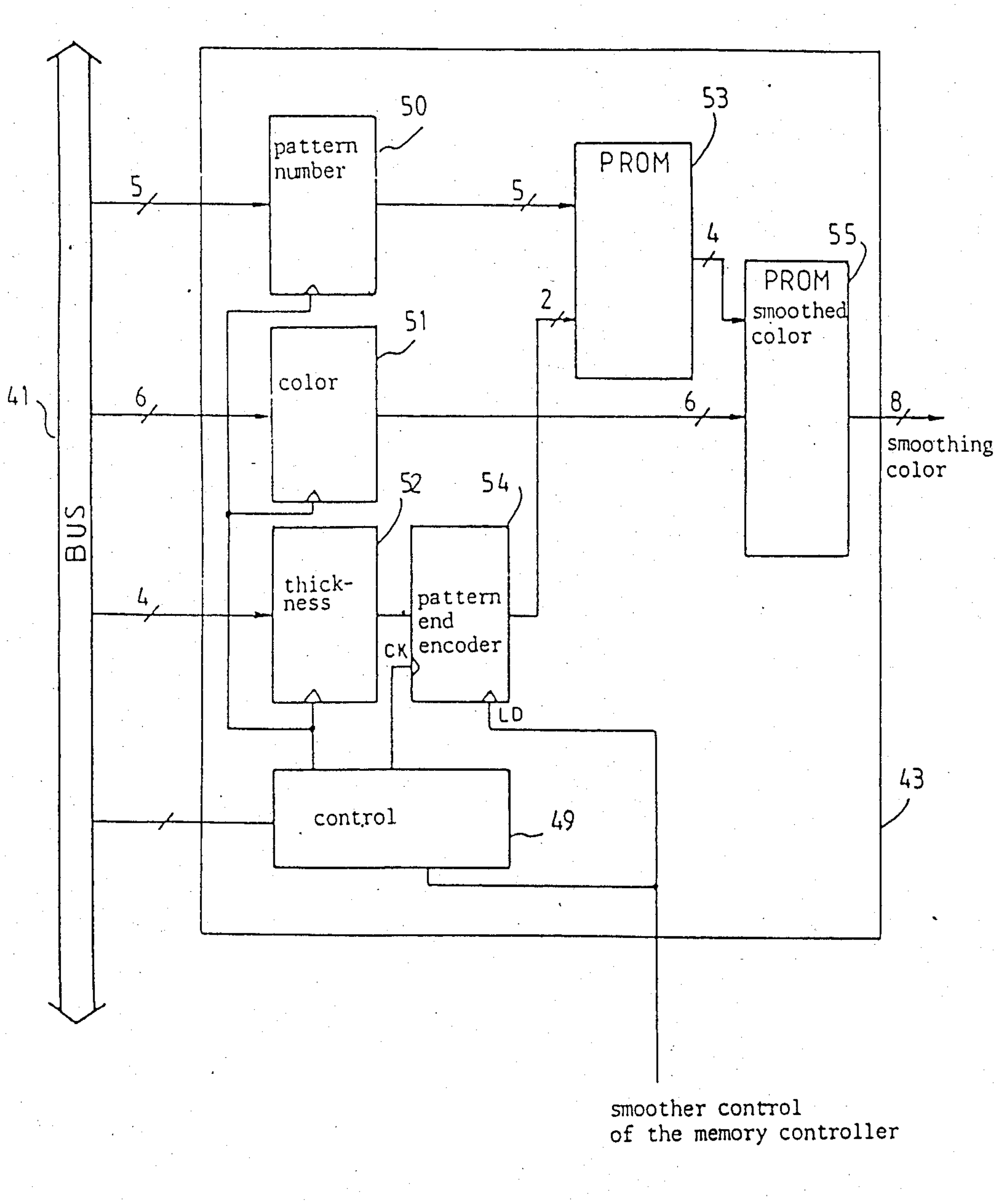
FIG. 23 is the diagram of the smoothing chart used in the device shown in FIG. 21.

The above described process may be carried out by a processor whose architecture is shown in FIGS. 22 and 23.

This processor comprises first of all a central unit 40 for executing a smoothing algorithm such as those previously described, this central unit 40 being connected, through an interface and a BUS 41 to two sub-assemblies, namely a memory controller 42 and a smoother 43.

The memory controller 42 is intended to manage all the writing and reading accesses to a video memory 44, as well as the synchronizing signals for the visualization device, in this case a television tube with analog input 45, and the synchronizing control for initiating the smoother 43.

The video memory 44 used is divided into memory planes $44_a$, $44_b$, $44_c$, $44_d$ for defining, each one, a coding bit for each of the pixels of the image. The information supplied by the video memory 44 is transmitted to a programable memory 46 (PROM LOOK UP TABLE) which transcodes the logic information from memory planes $44_a$, $44_b$, $44_c$, 44into digital RVB color information. This digital color information is then transmitted to a convertor 47 transforming the digital color information into separate analog information for each RVB gun of the television tube 45.

Because of the television scanning, reading of the memory planes $44_a$ to $44_d$ is periodic at a frequency depending on the refreshing frequency of the image.

The memory controller 42 regularly increments the addresses to be read and transmits the synchronizing signals to the television tube 45, namely:

the horizontal sync signals, the vertical sync signals.

This management of the reading accesses is organized about a CRTC component for example the component MC 6845 manufactured by the firm Motorola.

The memory controller 42 also manages the reading/writing timing of the video memory 44 as a function of the refreshing frequency of the image. It only allows writing into the memory planes at certain times.

The memory controller 42 also generates the address for writing in the memories $44_a$ to $44_d$. The writing address is formed from the X, Y information of the pattern to be plotted, the thickness and the octant. The reception of the pattern number starts up the writing sequence of all the pixels of the pattern and actuates the smoother 43. The successive addresses of all the pixels are calculated so as to be available during consecutive memory writing cycles. The smoother presents at these times the color to be written in the memory.

Such as shown in FIG. 23, the smoother used in the above described processor comprises first of all, connected to the BUS 41:

a logic control circuit 49 for register loading and timing identical to the writing timing in video memory 44, and three registers 50, 51, 52 for storing the information useful for smoothing, namely:

the information concerning the color number to be plotted (register 51), information concerning the number of the patterns (register 50), informaton concerning the thickness of the plot (register 52).

The smoother further comprises a programable smoothing memory PROM 53 connected by its inputs to register 50 intended for the numbers of the patterns and to register 52 intended for the information concerning the thickness of the plot, through an end encoder 54 which in fact consists of a down-counter associated with an output indicating the loading, any down-counting, the end of down-counting. The programable smoothing memory 53 contains the description of all the patterns used and more especially the intermediate color numbers (1, 2, 3) and the color numbers (4).

This programed smoothing memory 53 is connected by its output to the input of the a programed memory 55, for describing, for each color number, the four smoothing colors to be used and for transmitting the corresponding information to video memory 44. This programed memory 55 is also connected by its input to register 51 containing the information concerning the color number to be plotted.

The logic control circuit 49 drives the three registers 50, 51, 52 as well as the end encoder 54. It detects the presence of information on BUS 41 concerning the smoother and generates the order for loading into the corresponding register.

The control of the memory controller 42 starts up the next operating sequence of the end encoder 54:

- loading of thickness information into the end encoder 54 and activation of the output of this encoder 54 so as to signify "top pixel" of the pattern;
- decrementation of the down-counter of the end encoder 54 and activation of the output to signify "center pixel" of the pattern;
- stopping of decrementation of the end encoder 54 and activation of the output to signify "bottom pixel" of the pattern.

This sequence is controlled so that the time between two down-counts is equal to the time between two consecutive write-ins into the video memory 44. Thus, the output of the information concerning the color coming from the smooth and the output of the address of the pixel are synchronous.

The information relating to the number of the pattern supplied by register 50 and the information supplied by the end encoder 54 allow the type of intermediate color to be written into memory 53, that is to say the intermediate colors 1, 2, 3, or the plotting color 4. With this information, the programable memory 44 (smoothed color) can be addressed with the number of the color and so the smoothing color code can be obtained for really writing into the video memory 44.

The output of smoother 43 is always active, the control simply ensuring that the correct color information is presented to the data writing BUS 56, from the video memory 44 when the writing addresses and orders are sent by the memory controller 42.

What is claimed is:

1. A process for plotting, from a theoretical curve, a corresponding curve with smoothing on a visualization surface of a visualization module, said visualization surface being divided into pixels in a first mesh network with given pitch, by causing, through scanning, the illumination of a number of pixels whose position is determined so as to obtain the form of the theoretical curve to be plotted, this process comprising the following steps:

- previous storage of a predetermined number of patterns formed from at least two adjacent pixels disposed in the same line or in the same column, and each representing an elementary curve portion, these patterns being addressable as a function of the position in the pattern of said theoretical curve,
- determination, by an incremental procedure, of the set of points best following said theoretical curve in a second mesh network,
- determination of the closest pixels of said visualization surface to said determined points,
- measurement of the distance e from each of said closest pixels to said theoretical curve,
- determination, as a function of this distance e, of the pattern whose elementary curve portion corresponds to that of said theoretical curve to be plotted, and
- illumination of said pattern on said visualization surface.

2. The process as claimed in claim 1, wherein all the patterns have the same total luminance value.

3. The process as claimed in claim 1, in which said determination of the pattern whose elementary curve portion corresponds to that of said theoretical curve to be plotted comprises:

- previous storage of reference values $h_1 \ldots h_n$ representative of successive fractions of the pitch of said first mesh network,
- determination of the position of the value e with respect to said reference value, and
- determination of the pattern which corresponds to said position.

4. The process as claimed in claim 3, wherein three patterns a, b, c, are used each formed from a pair of adjacent pixels, the position of the elementary curve portion of pattern a being central, whereas the positions of the elementary curve portions of patterns b and c are offset with respect to said central portion and wherein pattern a is applied when the value e satisfies the relationship $(h_1<e<h_2)$ or $(h_3<e<h_4)$, pattern b is applied when the value e satisfies the relationship $(0<e\leqq h_3)$ and pattern c is applied when the value e satisfies the relationship $(h_2\leqq e\leqq 0)$ with $(h_1<h_2<0<h_3<h_4)$.

5. The process as claimed in claim 3, wherein four patterns d, e', f, g are used each formed by three aligned pixels, the position of the elementary curve portion of pattern d being central, the positions of the elementary curve portions of patterns e' and f being intermediate and the position of the elementary curve portion of pattern g being at the end and wherein the pattern d is applied when the value of e satisfies the relationship $(h_5\leqq e\leqq h_6)$ or $(h_7<e\leqq h_8)$, pattern f is applied when the value of e satisfies the relationship $(h_9\leqq e\leqq h_5)$, pattern e' is applied when the value of e satisfies the relationship $(h_8<e\leqq h_9)$ and pattern g is applied when the value of e satisfies the relationship $(h_{10}<e<h_9)$ with $(h_5<h_6<h_7<h_8<h_9<h_{10})$.

6. The process as claimed in claim 1 for smoothing a curve for equation $F(x,y)=0$, by an incremental procedure by determining, from the contact elements of the ends of the curve, the discrete set (xi, yi) of the points best following said curve in a mesh network with a finite number of lines and columns, whose pitch is reduced to a fraction of the pitch of the first mesh network of the visualization surface, this process comprising the following steps:

- calculation of the partial derivatives of the function at the point marking the beginning of the curve with coordinates $x=x_D$, $y=y_D$,
- determination of the horizontal and vertical character of the pattern to be applied depending on the sign of the first derivatives Fx, Fy and on the sign of the difference between the absolute values of FX and FY, determination of an octant change, testing for the end of the curve for algorithm termination, determination of a new point incremented by $\Delta x$, $-\Delta x$, $\Delta y$ or $-\Delta y$ equal in absolute value to the reduced pitch depending on the octant and on the sign of the function F(x,y), updating F(x,y) and said partial derivatives at the new point obtained on the reduced pitch mesh network, depending on whether the pattern to be applied is vertical or horizontal, detection of the passage of x or y to a whole value, in the case where y is whole, determination of a pattern as a function of the value e which is substantially equal to the value of the fractional part of x and illumination of the corresponding pattern, in the case where x is whole, determination of a pattern as a function of the value e which is substantially equal to the value of the fractional part of y and illumination of the corresponding pattern, and repetititon of the procedure from said detection of the change of octant once a pattern has been illuminated.

7. The process as claimed in claim 6, wherein, in the case where the variable y is whole, determination of a pattern as a function of the value e is obtained by means of truth table, from the sign of the derivative $\partial F(x,y)/\partial y$ and from the sign of the function F at the point considered, illumination of this pattern taking place at the point (x', y), x' being determined by a truth table as a function of the derivative $\partial F(x,y)/\partial y$ and of the sign of F(x,y), and wherein, in the case where the variable x is whole, determination of a pattern as a function of the value e is obtained by means of a truth table, from the sign of the derivative $\partial F(x,y)/\partial x$ and from the sign of the function F at the point considered, illumination of this pattern taking place at the point (x,y'), y' being determined by means of a truth table as a function of the derivative $\partial F(x,y)/\partial x$ and of the sign of F(x,y).

8. The process as claimed in claim 1 for plotting on a visualization surface having a first color $C_n$, a curve having a second color $C_o$, and an area adjacent to said curve and extending on both sides thereof, said area having several intermediate colors between said first and second colors, wherein said patterns are formed from at least two adjacent pixels each having one of said first, second and intermediate colors.

9. The process as claimed in claim 8, wherein said intermediate colors are taken from the color $C_n$, $C_o$ joining said first and second colors in a uniform color space.

10. The process as claimed in claim 9, wherein the distance between two successive colors $C_o, C_1 \ldots C_n$ on said segment is constant.

11. The process as claimed in claim 9, in which said color space comprises three primary colors, and said first, second and intermediate colors being carried out by adding these primary colors.

12. The process as claimed in claim 11, wherein determination of the color of a pixel of a pattern close to the curve is obtained by applying to this pixel a reconstruction filter and calculating, by a convolution between the curve to be plotted and the filter, the contribution of the curve to this pixel through the filter, so as to deduce therefrom the color to be attributed to the pixel for regenerating the effect produced by the curve passing close to this pixel.

13. The process as claimed in claim 12, wherein the color $C_p$ of the pixel is determined by the equation:

$$C_p = C_f + K(d,h)\,(C_t - C_f)$$

in which equation:

$C_f$ is said first color, $C_t$ is the line color, and

K(d,h) is a variable whose value for a curve of given thickness depends on the reconstruction filter, on the distance d of the pixel to the curve and on the thickness of the curve.

14. The process as claimed in claim 13, wherein the variable K(d,h) is determined by a table of truth providing, for each of the pixels forming a pattern, the value of K(d,h) as a function of the value e for determining this pattern.

* * * * *

UNITED STATES PATENT AND TRADEMARK OFFICE
CERTIFICATE OF CORRECTION

PATENT NO. : 4,698,768

DATED : October 6, 1987

INVENTOR(S) : Thuy et al

It is certified that error appears in the above-identified patent and that said Letters Patent is hereby corrected as shown below:

On the title page inventors and assignee should read

--(75) Inventors: Pham Duc Thuy, Chatenay Malabry; Dominique Vanypre, Igny, both of France --.

-- Assignee: Societe Francaise D'Equipments Pour La Navigation Aerienne (S.F.E.N.A.) --.

Signed and Sealed this

Thirteenth Day of September, 1988

*Attest:*

DONALD J. QUIGG

*Attesting Officer*

*Commissioner of Patents and Trademarks*